(12) United States Patent
Fuller et al.

(10) Patent No.: US 8,294,429 B2
(45) Date of Patent: Oct. 23, 2012

(54) ROBUST DIGITAL VOLTAGE REGULATOR

(75) Inventors: Randy Fuller, Hillsburgh (CA); Yuan Yao, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 438 days.

(21) Appl. No.: 12/470,974

(22) Filed: May 22, 2009

(65) Prior Publication Data
US 2010/0295518 A1 Nov. 25, 2010

(51) Int. Cl.
- H02P 9/10 (2006.01)
- H02P 9/14 (2006.01)
- H02P 11/00 (2006.01)
- H02P 9/00 (2006.01)
- H02H 7/06 (2006.01)

(52) U.S. Cl. ........... 322/28; 322/24; 322/29; 322/70; 318/400.3; 323/269; 323/271; 323/282; 323/283; 290/40 B (58) Field of Classification Search ........... 322/28, 322/24, 29, 70; 361/18; 318/400.3; 323/282, 323/283, 269, 271; 307/43–50; 290/40 B; H02P 9/00, 9/10, 9/14, 11/00; H02H 7/06
See application file for complete search history.

(56) References Cited

U.S. PATENT DOCUMENTS

| | | | |
|---|---|---|---|
| 4,701,690 A | | 10/1987 | Fernandez et al. |
| 5,294,879 A | * | 3/1994 | Freeman et al. ............. 322/23 |
| 5,305,215 A | * | 4/1994 | Brekkestran et al. ......... 701/51 |
| 5,648,759 A | * | 7/1997 | Miller et al. ................. 340/660 |
| 6,025,700 A | * | 2/2000 | Czajkowski ................. 322/59 |
| 6,189,107 B1 | | 2/2001 | Kim et al. |
| 6,208,242 B1 | * | 3/2001 | Engelmann et al. .......... 340/438 |
| 6,665,158 B2 | * | 12/2003 | Walter ........................ 361/18 |
| 6,750,636 B2 | | 6/2004 | Hocken et al. |
| 7,034,508 B1 | * | 4/2006 | Sasaki et al. ................. 322/28 |
| 7,414,326 B2 | | 8/2008 | Montgomery, Jr. et al. |
| 2001/0009363 A1 | | 7/2001 | Rice et al. |
| 2003/0026615 A1 | * | 2/2003 | Watanabe et al. ............ 396/429 |
| 2005/0063348 A1 | * | 3/2005 | Donovan ..................... 370/338 |
| 2007/0075690 A1 | * | 4/2007 | Chuang et al. ............... 323/269 |
| 2007/0133338 A1 | * | 6/2007 | Hoffmann .................... 365/233 |

(Continued)

FOREIGN PATENT DOCUMENTS

EP 233425 A1 * 8/1987

OTHER PUBLICATIONS

Fauvet Jean Pierre, EP 0233425 A1, Englsih translation, 1986.*

(Continued)

*Primary Examiner* — John K Kim
(74) *Attorney, Agent, or Firm* — Shimokaji & Assoc., PC (57) ABSTRACT

A system and method are disclosed for regulating a generator controlled power signal. An exemplary embodiment of the system may include both a digital voltage regulator and an analog voltage regulator and a selector switch configured to switch modulation control between the digital and analog voltage regulators. A watchdog detection circuit may be included for detecting an upsetting event in the digital voltage regulator and may trigger switching of the generator excitation input voltage modulation from the digital voltage regulator to the analog voltage regulator. An exemplary embodiment of the method may include modulating the generator excitation input voltage using the digital voltage regulator, detecting an occurrence of an upsetting event in the digital voltage regulator, disabling the digital voltage regulator, and switching modulation of the generator excitation input voltage to the analog voltage regulator.

13 Claims, 5 Drawing Sheets

U.S. PATENT DOCUMENTS

2007/0179890 A1* 8/2007 Sandford et al. ............ 705/44
2010/0295518 A1* 11/2010 Fuller et al. ............ 322/70

OTHER PUBLICATIONS

Basler, Changing to Static, Enlargement Europe, pp. 60-61, 2009.
Larry Perez, Designing an Excitation System With a Standby Generator (Part Two), Electricity Today Magazine, The Electricity Forum, 2002.
Mitsubishi Electric, Digital Automatic Voltage Regulator, May 1998.
Basler, Pre-Packaged Dual DECS-200 Excitation System Reduces Engineering and Installation Time and Increases Reliability, Basler Application Notes, May 2002.
Kato Engineering Inc., Automatic/Manual Redundant Voltage Regulator System, Leroy Somer North America, Mar. 2003.
Power Design India, Turnkey solutions for retrofitting excitation systems, May 9, 2002, Global Sources.com.

* cited by examiner

ROBUST DIGITAL VOLTAGE REGULATOR

BACKGROUND OF THE INVENTION

The present invention generally relates to generator control systems and more particularly, to aircraft voltage regulators.

It is known for generator control systems in aircraft to implement software-based digital control mechanisms like RMS voltage control, compensation for PMG voltage in variable frequency systems.

Figure 1:
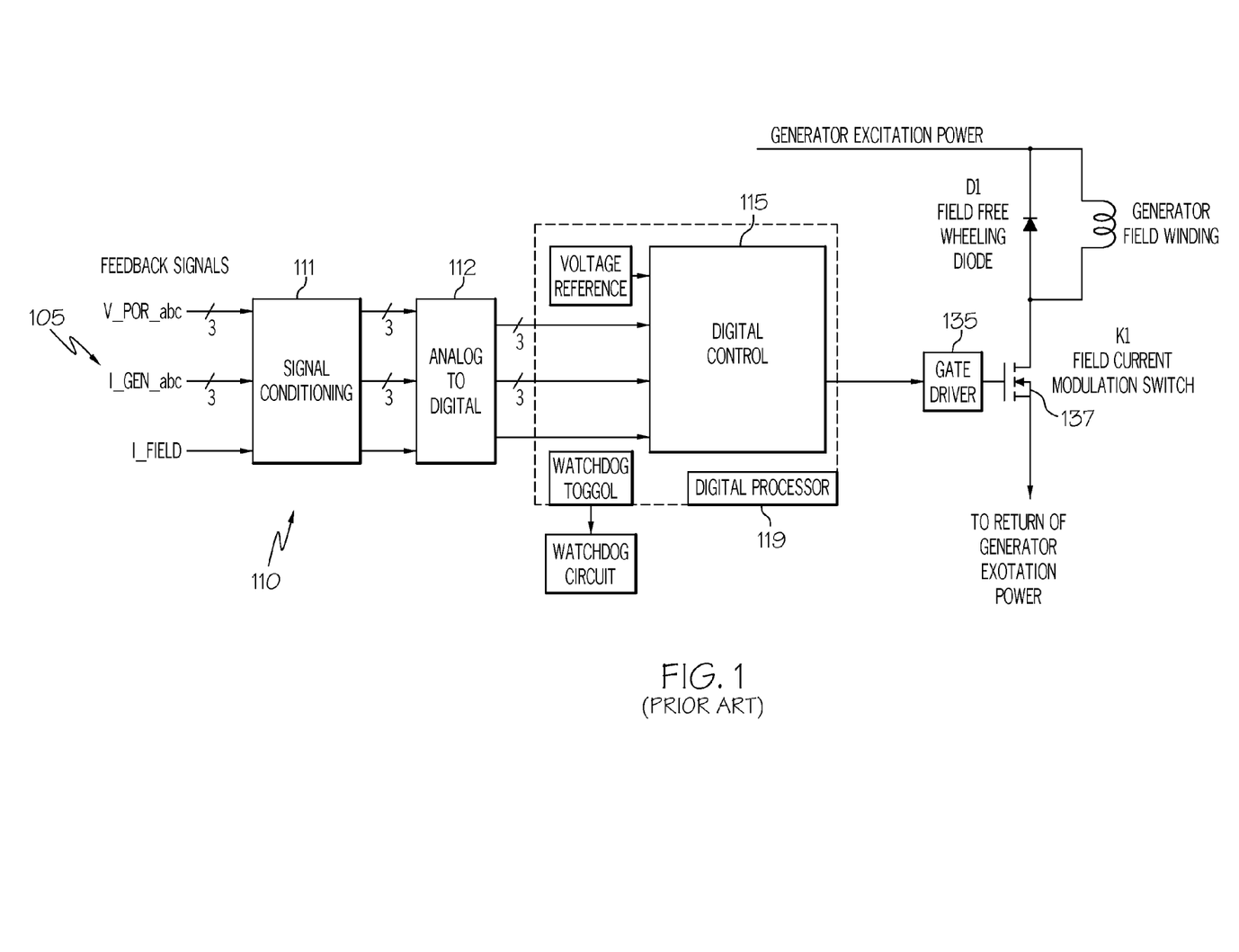
FIG. 1 is a schematic depicting a prior art generator control circuit.

Referring to FIG. 1, a prior art configuration illustrates a typical software-based voltage control using a digital voltage regulation system 110. As shown in FIG. 1, analog control feedback signals 105 are conditioned in a signal conditioning unit 111 and converted to digital in an analog to digital converter 112. The feedback signals 105 may then be fed to a digital control 115 for compensation control. The control algorithm that may be used varies depending on the application and desired effectiveness of control. Based on the control algorithm, the digital processor 119 commands the digital control 115 to generate a gating signal to a gate driver 135 and a field modulation switch 137 to perform pulse width modulation (PWM) on the generator excitation voltage supply. Therefore the generator field excitation current is adjusted dynamically to minimize the voltage variation at the point of regulation at different operating conditions.

In some cases software-based control using digital voltage regulation may be susceptible to Single/Multiple Event Upsets (SEU) and indirect effects from lightning. Such effects may cause a microprocessor or digital signal processor 119 to reset or stop functioning. During this time, all devices connected to the power system may temporarily shutdown and require a few seconds to get back into the original operating state. These types of events could incur serious workload issues for the aircraft electrical power systems and potentially have dangerous results for pilots flying the aircraft.

As can be seen, there is a need for a generator regulator system that can function during temporary interruption of regulation.

SUMMARY OF THE INVENTION

In one aspect of the present invention, a voltage control system, comprises a digital voltage regulator enabled and configured to produce a digital gating signal to modulate a field current; an analog voltage regulator, pre-set disabled and configured to produce an analog gating signal to modulate the field current; and a selector switch coupled between the digital voltage regulator and the analog voltage regulator, wherein the selector switch is configured to cease a transmission of the digital gating signal from the digital voltage regulator upon detection of an upsetting event in the digital voltage regulator and further configured to enable transmission of the analog gating signal from the analog voltage regulator to the field current.

In another aspect of the present invention, a voltage regulator circuit, a digital voltage regulator enabled and configured to produce a digital gating signal to modulate a field current; an analog voltage regulator, pre-set disabled and configured to produce an analog gating signal to modulate the field current; a selector switch coupled between the digital voltage regulator and the analog voltage regulator, wherein the selector switch is configured to cease a transmission of the digital gating signal from the digital voltage regulator upon detection of an upsetting event in the digital voltage regulator and further configured to enable transmission of the analog gating signal from the analog voltage regulator to the field current; and a watchdog detection circuit coupled to the selector switch and the digital voltage regulator for detecting an upsetting event in the digital voltage regulator, wherein the watchdog detection circuit transmits a command signal to the selector switch to disable transmission of the digital gating signal from the digital voltage regulator and enable transmission of the analog gating signal from the analog voltage regulator.

In a further aspect, a method of regulating a power signal from a generator, comprises the steps of generating a gating signal using a digital voltage regulator to modulate an excitation input voltage of the generator; detecting an occurrence of an upsetting event in an operation of the digital voltage regulator; disabling the digital voltage regulator; and modulating the excitation input voltage from the generator using an analog voltage regulator.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a voltage control system for re-directing transmission of a gating signal during digital processor upsets. In general, exemplary embodiments of the voltage control system of the present invention may provide a digitally controlled pulse width modulation of a generator excitation voltage under uninterrupted conditions with an expedient transition to an analog controlled pulse width modulation of the generator excitation voltage should an upsetting event occur. In an exemplary use, embodiments of the voltage control system may be used in aircraft where, during a lightning strike, a digital processor in the digitally controlled portion of the system may be reset or damaged to failure by the effects of the lightning. In one aspect, the voltage control system monitors the digitally controlled portion for an interruption in the operation of the processor, switches regulation from the digitally controlled portion to an analog controlled portion, thus maintaining uninterrupted modulation of the excitation input voltage from the generator control unit.

Figure 2:
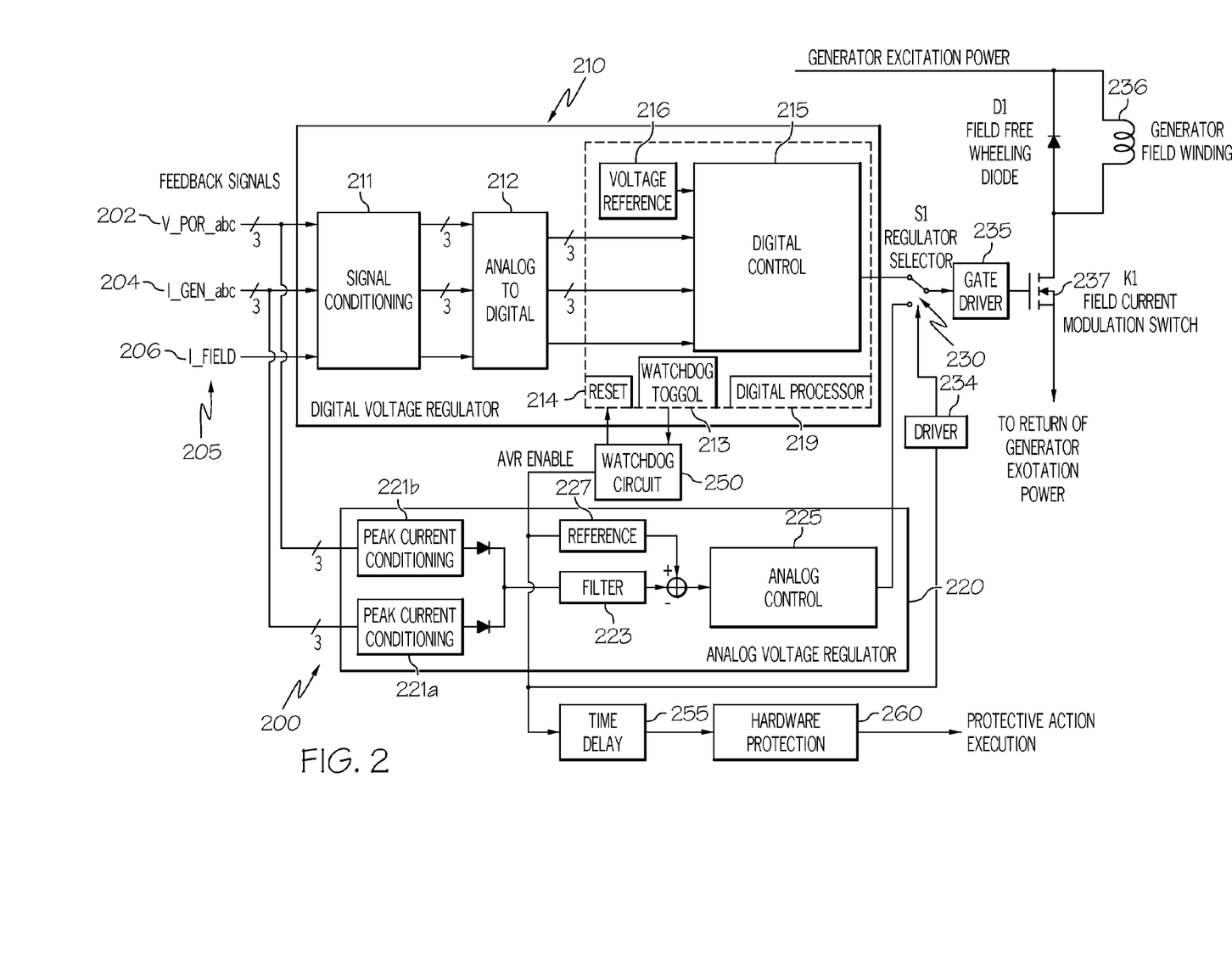
FIG. 2 is a schematic illustrating a generator control system in accordance with an exemplary embodiment of the present invention.

Referring now to FIG. 2, a voltage control system 200 is depicted showing a proposed exemplary circuit scheme. The voltage control system 200 generally may include a digital voltage regulator 210, an analog voltage regulator 220, and a regulator selector 230. The voltage control system 200 may also include a watchdog detection circuit 250, a field current modulation switch 237, a gate driver 235, a driver module 234 for regulator selector, a time delay circuit 255, and a hardware protection circuit 260. Feedback signals 205 may be transmitted from a point of regulation (not shown) into the control system 200. The feedback signals 205 may include a voltage point of regulation feedback signal 202, a generator current signal 204, and a field current signal 206. The voltage point of regulation feedback signal 202 and the field current signal 206 may each include three lines respectively.

The digital voltage regulator 210 may include a digital processor 219 that perform digital control 215, a signal conditioning circuit 211, an analog to digital converter 212, a voltage reference module 216, and a reset switch 214. The digital processor 219 may produce a watchdog toggle signal 213 that may be monitored by the watchdog detection circuit 250.

The analog voltage regulator 220 may include an analog control 225, peak voltage conditioning circuits 221a and 221b, a reference module 227, and a filter 223.

An exemplary circuit employing the above-described elements may be connected as follows. The field current modulation switch 237 may, for example, be a MOSFET connected on a generator field winding 236. A field free wheeling diode 239 maintains the field excitation current in a generator field winding 236 o be continuous when the field current modulation switch 237 is off. An opposite element of the field current modulation switch 237 provides a modulated field current back to the excitation power supply (not shown). An intermediate element of the field current modulation switch 237 may be connected to a gate driver 235 receiving a gating signal from the digital voltage regulator 210 or the analog voltage regulator 220. The gate driver 235 may also be connected to a regulator selector 230. The regulator selector 230 may be a switch-type device opening and closing line contacts between the gate driver 235 and the digital voltage regulator 210 or analog voltage regulator 220. In this exemplary embodiment, the regulator selector 230 is configured to transmit a digital gating signal from the digital voltage regulator 210 during normal operation. The regulator selector 230 is also configured to transmit an analog gating signal from the analog voltage regulator 220 during interruption of the digital voltage regulator 210. The watchdog detection circuit 250 may be connected to both the digital voltage regulator 210 and analog voltage regulator 220. The time delay circuit 255 may be connected to the analog voltage regulator 220 and to the hardware protection circuit 260, which in turn may be connected to a shutdown mechanism (not shown) capable of powering down the generator (not shown). Additionally, a driver module 234 may be connected between the watchdog detection circuit 250 and the regulator selector switch 230. The driver module 234 may provide command signals to open and close the regulator selector 230 and so that either the analog voltage regulator 220 or the digital voltage regulator 210 is connected to the gate driver 235 of the field current modulation switch 237 as desired.

Figure 5:
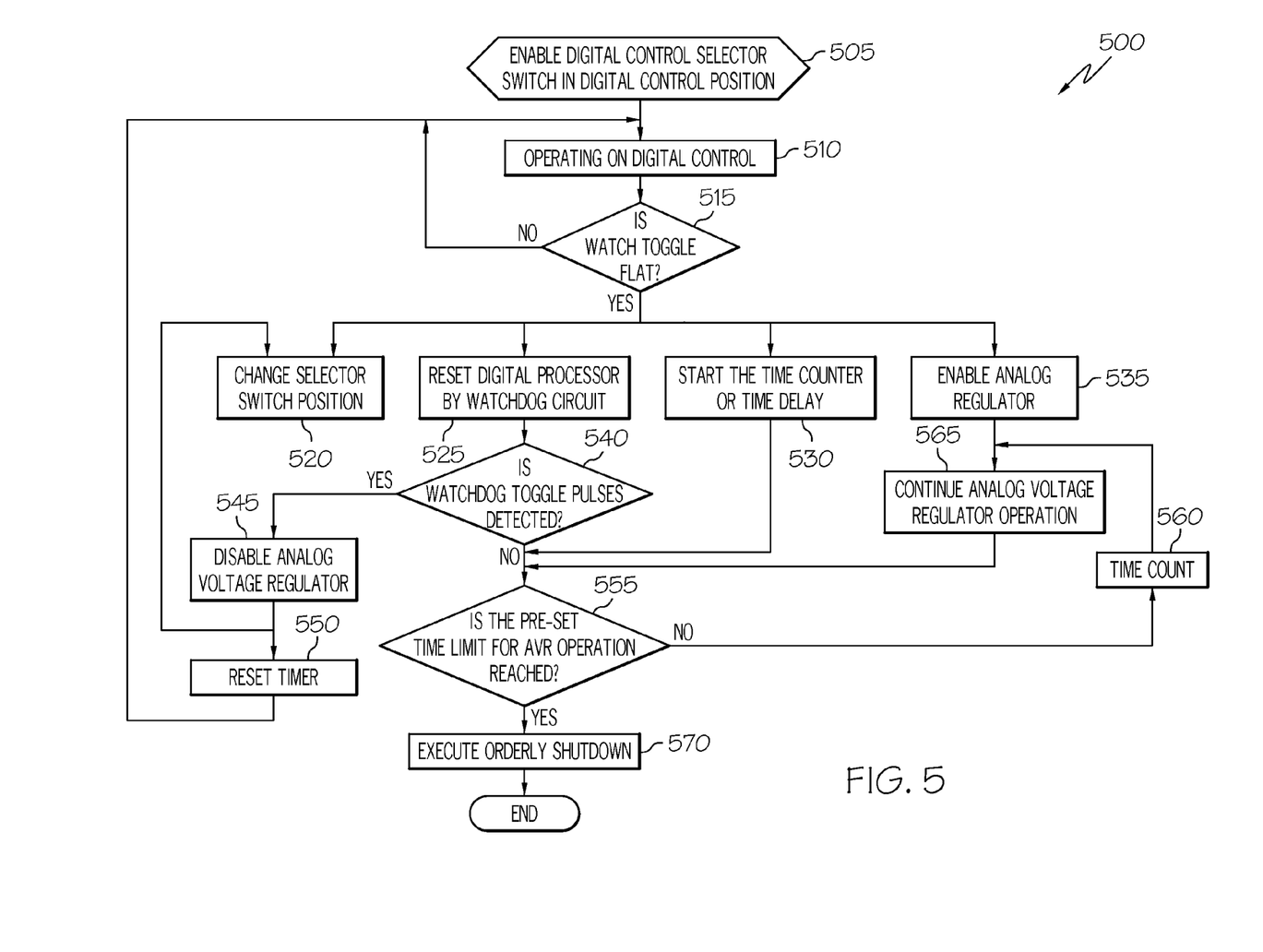
FIG. 5 is a flowchart depicting an exemplary series of steps in a method in accordance with another embodiment of the present invention.

Referring to FIGS. 2 and 5, under one exemplary operation, the voltage control system 200 may be configured with the regulator selector 230 creating a closed line contact with the digital voltage regulator 210 so that the digital voltage regulator is enabled for producing digital gating signals to the field current modulation switch 237 (Step 505). In step 510, feedback signals 205 may be received by the signal conditioning circuit 211. The feedback signals 205 may be conditioned and then may be transmitted to the analog to digital converter 212. The analog to digital converter 212 may convert the feedback signals 205 to a digital signal for receipt by the digital controller 215. The digital controller 215 may perform actions under the direction of the digital processor 219. Actions may include checking the digital signal for signal levels against stored threshold levels in the voltage reference module 216 and transmitting the digital signal to the gate driver 235 through the regulator selector 230. The gate driver 235 may transmit the digital gating signal to the field current modulation switch 237. Additionally, the digital processor 219 may produce an oscillating waveform signal, a watchdog toggle signal 213, which may be monitored and evaluated by the watchdog detection circuit 250.

The regulator selector 230 may have an open contact line with the analog voltage regulator 220 when the digital voltage regulator is operational. The analog voltage regulator 220 may be pre-set as disabled or inoperative by setting a setpoint in its voltage reference in the reference module 227 to zero. Therefore, the analog voltage regulator 220 may not produce gating since the feedback signals 205 signal levels may be greater than the setpoint. In some applications, the analog voltage regulator 220 may not be required to operate in current/power limit mode, and thus, in one exemplary embodiment, the generator current feedback signal 204 may not need to be connected to the analog voltage regulator 220. Thus, an analog voltage regulator with less connections offers a simplified GCU design.

Under uninterrupted operating conditions, the regulator selector 230 may be at a default position passing the gating signal of the digital voltage regulator 210 to the field current modulation switch 237. In Step 515, when the digital processor 219 experiences an upsetting event and stops functioning or is toggled off, the normally oscillating watchdog toggle signal 213 from the processor may become flat. Upsetting events may include for example, single or multiple event upsets, and lighting strike damage/overloads. The flattened watchdog toggle signal 213 may quickly be detected by the watchdog detection circuit 250. In response, voltage control system 200 may take steps to transition production of the gating signal from the digital voltage regulator 210 to the analog voltage regulator 220.

The watchdog detection circuit 250 may produce a watchdog detection (or AVR Enable) discrete signal that can be either high or low depending on the design convenience. In step 535, upon detection of an upsetting event in the digital voltage regulator 210, the watchdog detection signal may enable the reference module 227 of the analog voltage regulator 220 to adjust the point of reference from zero to a predetermined voltage enabling operation of the analog voltage regulator 220. The analog voltage regulator 220 may then start to generate the pulse width modulation gating signal based on the feedback signals 205. The analog control can be active within 200 micro seconds of enablement of the analog voltage regulator 220. In Step 520, the watchdog detection circuit 250 may also send a command to the driver 234 triggering the regulator selector 230 to switch gating feed over to the analog voltage regulator 220 from digital voltage regulator 210. In Step 535, the conditioned signals in 221a and 221b may be transmitted to the filter 223. Filtered signals may then be received by the analog control 225 which produces the analog gating signal that is transmitted through the regulator selector 230 into the gate driver 235.

Figure 3:
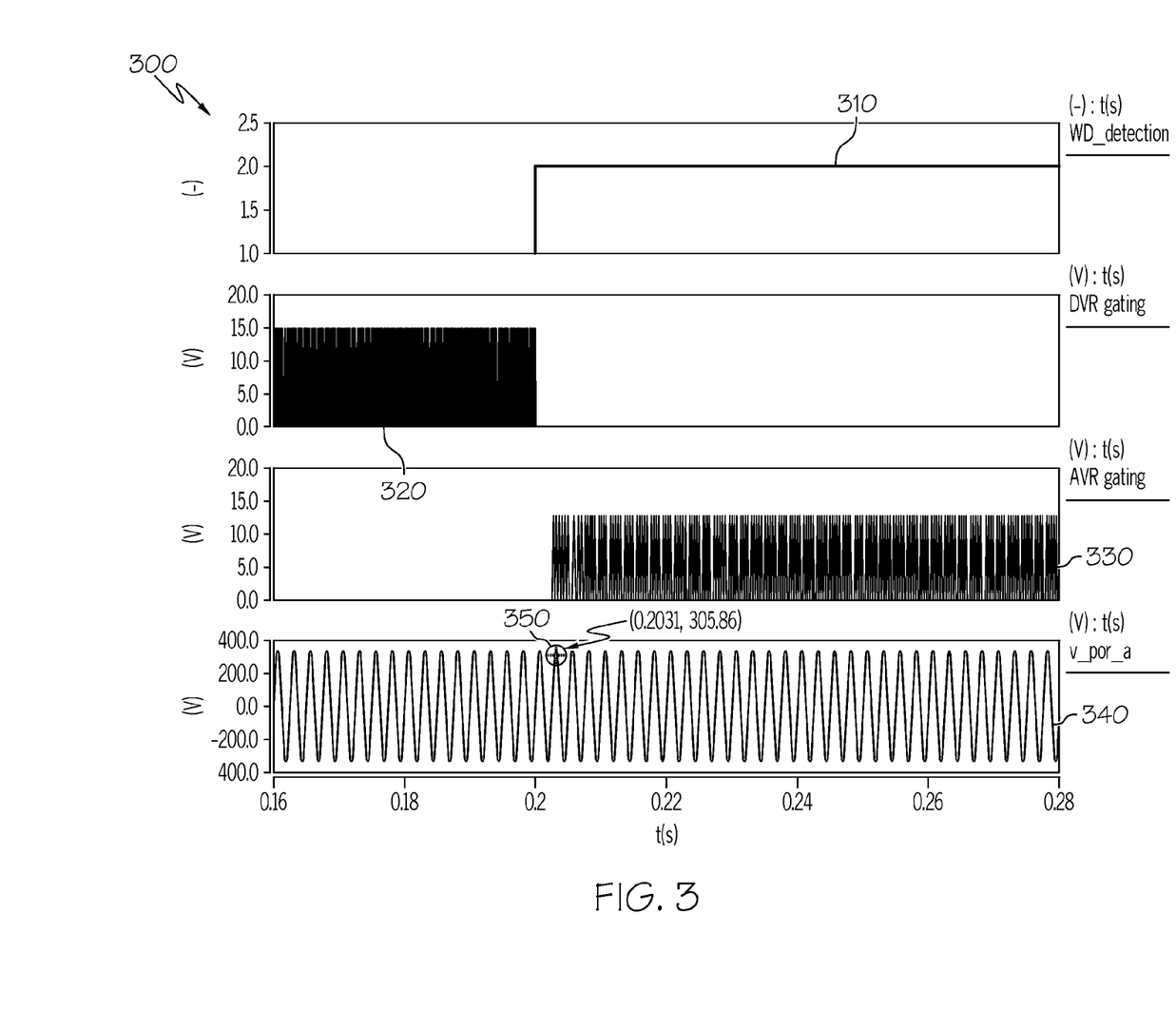
FIG. 3 is a graph illustrating an exemplary signal transition from a digital voltage regulator to an analog voltage regulator in accordance with an exemplary embodiment of the present invention.

FIG. 3 depicts a simulated signal transient 300 of a watchdog detection signal trace 310, a digital voltage regulator gating signal trace 320, an analog voltage regulator gating signal trace 330, and a voltage trace 340 at the point of regulation. (POR) The signal transient 300 shows a point of regulation voltage transient during the transition from digital to analog control. In this simulated performance of the voltage control system 200, once the watchdog detection signal is high and the digital voltage regulator 210 gating signal stops, the analog voltage regulator 220 gating signal starts modulating in about 2 milli-seconds. The POR voltage signal trace 340 drops from 350V to 305V peak (215 Vrms equivalent), which is well above commonly used voltage transient requirements.

At the same time when the watchdog detection circuit 250 sends the watchdog detection signal, it may also issue a discrete signal to the reset switch 214 to reset the digital processor 219 (Step 525). If there is no other failure in the digital processor 219, in other words, if the processor resumes producing oscillating signals (Step 540), then the digital processor will start the reset process of generating a gating signal. In Step 545, the analog voltage regulator may be disabled and the regulator selector switch 230 may switch position to enable digital gating signals received from the digital voltage regulator 210.

In addition to the actions described above, the analog voltage regulator 220 enabling signal may also be logged by the time delay circuit 255 (Step 530). The time delay circuit 255 may have a pre-set time delay that is sufficient to allow the digital processor 219 to be reset in an orderly manner during analog voltage regulation. The duration of the time delay depends on the application and can be as long as several seconds. In Step 555, if the time limit for the time delay is not reached, the count continues in Step 565 and operation of the analog voltage regulator 220 continues. If the digital processor 219 resets successfully, the watchdog toggle signal 213 will resume normal oscillation. Once the digital processor 219 is functional again, it may start the control computation and generate the pulse width modulation gating signal. When the watchdog detection circuit 250 detects the normal watchdog toggle signal 213, the watchdog detection circuit 250 will flip which will send a signal turning the regulator selector switch 130 off. In other words, the regulator selector 230 may open the contact line to the analog voltage regulator 220 and close the contact line to the digital voltage regulator 210 to allow digital control of the gating signal to pass to the field current modulation switch 237. At the same time the watchdog detection circuit 250 may reset the time delay circuit 255 (Step 550).

Figure 4:
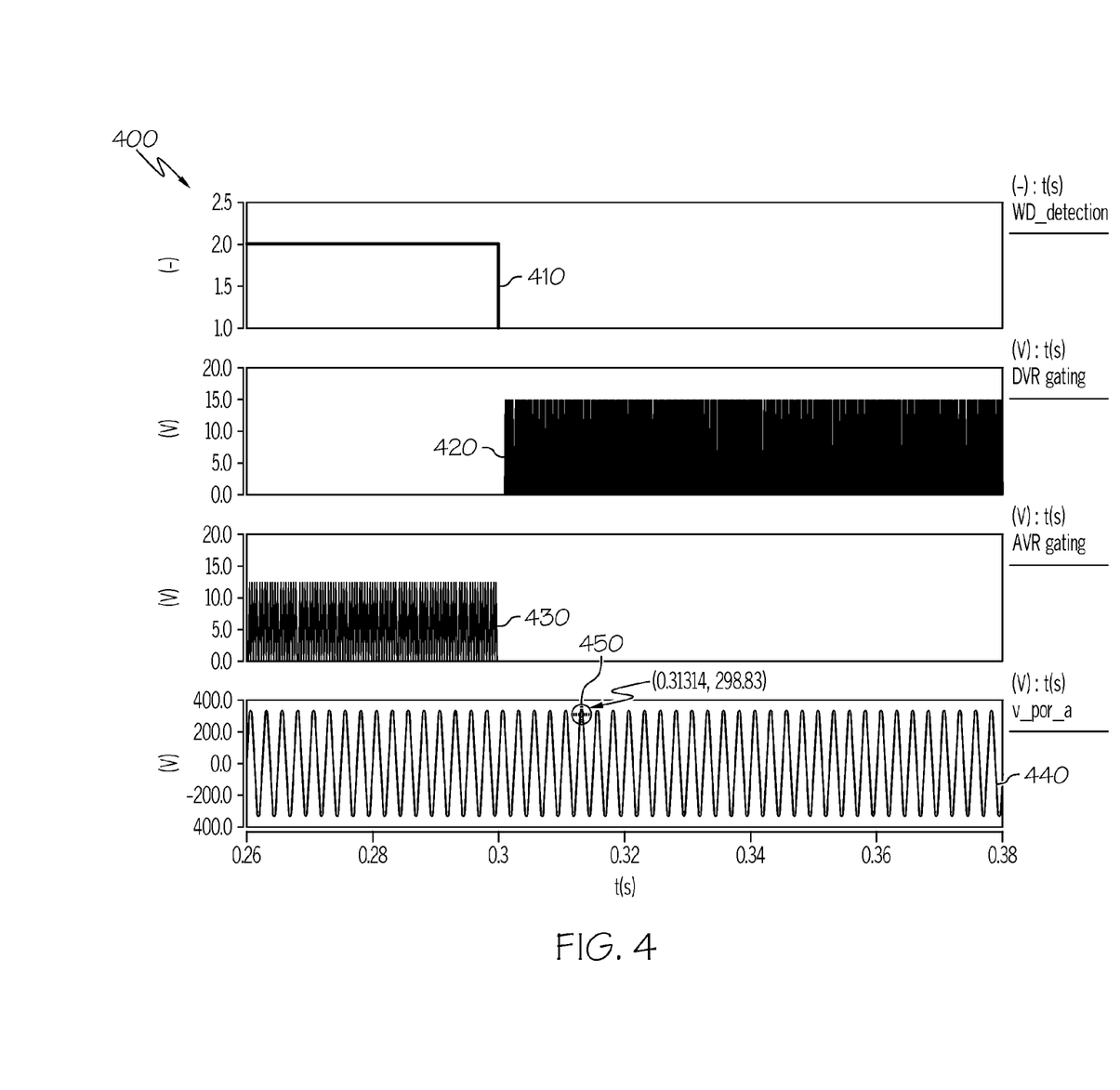
FIG. 4 is a graph illustrating an exemplary reset of a signal from an digital voltage regulator in accordance with an exemplary embodiment of the present invention.

FIG. 4 depicts a simulated transient during transition of the gating signal from the analog voltage regulator 220 to digital voltage regulator 210. A simulated signal transient 400 of a watchdog detection signal trace 410, a digital voltage regulator signal trace 420, an analog voltage regulator signal trace 430, and a POR voltage signal trace 440 depicts the watchdog detection signal trace 410 dropping from high to low, signaling a reset of the digital processor 219 and of the digital voltage regulator 210. The POR voltage trace 440 drops a little more than that of the POR voltage 350 (FIG. 3) in the transition from the digital to analog control because it may take more time for the digital control function to return to normal due to the reset process. However, the voltage is maintained and the transient meets stringent power quality requirements seen in the aerospace industry.

If the digital processor 219 fails to recover when the end of time delay is reached (Step 555), a hardware protection circuit 260 may be activated. In Step 570, the function of the hardware protection circuit 260 may include executing an orderly shut-down of the generator control unit which may include de-energizing the generator, taking the generator off line by opening the generator line contactor and informing aircraft of the fault.

It should be understood, of course, that the foregoing relates to exemplary embodiments of the invention and that modifications may be made without departing from the spirit and scope of the invention as set forth in the following claims.

We claim:

1. A voltage control system comprising:
    a digital voltage regulator enabled and configured to produce a digital gating signal to modulate a field current;
    an analog voltage regulator, pre-set disabled and configured to produce an analog modulating signal to modulate the field current;
    a selector switch coupled between the digital voltage regulator and the analog voltage regulator, wherein the selector switch is configured to cease a transmission of the digital gating signal from the digital voltage regulator upon detection of an upsetting event in the digital voltage regulator and further configured to enable transmission of the analog modulating signal from the analog voltage regulator to a field current switch modulating the field current;
    a gate driver connected to the selector switch, wherein the gate driver is configured to transmit the digital gating signal to the field current switch under uninterrupted operating conditions and to transmit the analog modulating signal to the field current switch during the detection of the upsetting event; and
    a driver module connected to the analog voltage regulator configured to send a command to the selector switch to close a line contact to the analog voltage regulator during the detection of the upsetting event.

2. The voltage control system of claim 1, wherein the digital voltage regulator is disabled upon the detection of the upsetting event and the analog voltage regulator is enabled upon detection of the upsetting event.

3. The voltage control system of claim 2, further comprising a reset switch for re-enabling the operation of the digital voltage regulator.

4. The voltage control system of claim 3, wherein the selector switch is configured to re-transmit the digital gating signal from the digital voltage regulator and cease transmitting the analog modulating signal from the analog voltage regulator upon the reset switch re-enabling the digital voltage regulator.

5. The voltage control system of claim 1, further comprising a voltage reference module in the analog voltage regulator initially setting a voltage reference to zero and then setting the voltage reference to a predetermined value upon enablement of the analog voltage regulator.

6. The voltage control system of claim 3, further comprising a time delay circuit configured to limit an operating duration of the analog voltage regulator after a pre-set time delay.

7. A voltage regulator circuit, comprising:
    a digital voltage regulator enabled and configured to produce a digital gating signal to modulate a field current;
    an analog voltage regulator, pre-set disabled and configured to produce analog modulating signal to modulate the field current;
    a selector switch coupled between the digital voltage regulator and the analog voltage regulator, wherein the selector switch is configured to cease a transmission of the digital gating signal from the digital voltage regulator upon detection of an upsetting event in the digital voltage regulator and further configured to enable transmission of the analog modulating signal from the analog voltage regulator to a field current switch modulating the field current;

a gate driver coupled to the selector switch configured to conditionally transmit the digital gating signal to the field current switch;

a driver module connected to the analog voltage regulator configured to send a command to the selector switch to close a line contact to the analog voltage regulator during the detection of the upsetting event; and a watchdog detection circuit coupled to the driver module and the digital voltage regulator for detecting an upsetting event in the digital voltage regulator, wherein the watchdog detection circuit transmits a command signal to the driver module to conditionally control the selector switch to disable transmission of the digital gating signal from the digital voltage regulator and enable transmission of the analog modulating signal from the analog voltage regulator.

8. The voltage regulator circuit of claim 7, further comprising a digital processor in the digital voltage regulator producing a watchdog detection signal upon detection of the upsetting event.

9. The voltage regulator circuit of claim 8, wherein:

the digital processor is toggled off in the presence of the upsetting event; and the watchdog detection circuit detects the upsetting event based on the watchdog toggle signal.

10. The voltage regulator circuit of claim 9, wherein the upsetting event is based on the watchdog toggle signal producing a signal ceasing oscillating.

11. The voltage regulator circuit of claim 9, further comprising a reset switch for resetting the digital processor to on.

12. The voltage regulator circuit of claim 11, wherein the reset switch is configured to send a reset signal to the digital processor resetting the digital processor upon receipt of a reset command from the watchdog detection circuit.

13. The voltage regulator circuit of claim 12, further comprising a hardware protection circuit connected to the watchdog detection circuit for executing a shut-down of the generator when the digital processor is unable to resume operation.

\* \* \* \* \*